(12) United States Patent
Obayashi

(10) Patent No.: US 7,134,794 B2
(45) Date of Patent: Nov. 14, 2006

(54) THRUST NEEDLE ROLLER BEARING

(75) Inventor: Kousuke Obayashi, Iwata (JP)

(73) Assignee: NTN Corporation, Osaka (JP)

( * ) Notice: Subject to any disclaimer, the term of this patent is extended or adjusted under 35 U.S.C. 154(b) by 195 days.

(21) Appl. No.: 10/895,115

(22) Filed: Jul. 21, 2004

(65) Prior Publication Data
US 2005/0018940 A1 Jan. 27, 2005

(30) Foreign Application Priority Data
Jul. 25, 2003 (JP) ............................ 2003-201871
Jun. 22, 2004 (JP) ............................ 2004-184029

(51) Int. Cl.
*F16C 33/46* (2006.01)

(52) U.S. Cl. ..................................... 384/623

(58) Field of Classification Search ......... 384/618–623
See application file for complete search history.

(56) References Cited

U.S. PATENT DOCUMENTS

| | | | | |
|---|---|---|---|---|
| 2,117,633 A | * | 5/1938 | Smith | 384/623 |
| 2,959,458 A | * | 11/1960 | Kaye | 384/608 |
| 3,380,790 A | * | 4/1968 | Osmond | 384/618 |
| 3,876,267 A | | 4/1975 | Schaeffler et al. | |
| 5,064,298 A | | 11/1991 | Hibi et al. | |
| 5,630,668 A | | 5/1997 | Ikezawa et al. | |
| 5,641,038 A | | 6/1997 | Akamatsu | |
| 5,807,920 A | | 9/1998 | Ueno et al. | |
| 2003/0086792 A1 | | 5/2003 | Kamiya et al. | |

FOREIGN PATENT DOCUMENTS

| | | |
|---|---|---|
| DE | 1 959 002 | 4/1967 |
| DE | 31 34 625 A1 | 4/1983 |
| DE | 41 30 227 A1 | 9/1992 |
| DE | 10110915 | 9/2002 |
| EP | 1 298 334 A2 | 4/2003 |
| FR | 1442235 | 6/1966 |
| GB | 1178292 | 1/1970 |
| JP | 2000-240645 | 9/2000 |
| JP | 2002-70872 | 3/2002 |
| JP | 2002-070872 | 3/2002 |
| JP | 2003-120684 | 4/2003 |
| JP | 2004324670 A | * 11/2004 |

* cited by examiner

Primary Examiner—Thomas R. Hannon
(74) Attorney, Agent, or Firm—McDermott Will & Emery LLP

(57) ABSTRACT

A thrust needle roller bearing includes a plurality of needle rollers, and an annular retainer having a plurality of pockets for retaining the needle rollers. The plurality of pockets accommodate the needle rollers arranged in multiple rows shifted from each other in a radial direction of the retainer, and the retainer is made of synthetic resin. The thrust needle roller bearing is light, can reduce friction between the retainer and the needle rollers, and has high durability.

8 Claims, 19 Drawing Sheets

THRUST NEEDLE ROLLER BEARING

BACKGROUND OF THE INVENTION

1. Field of the Invention

The present invention relates to a thrust needle roller bearing for use in a compressor of an air conditioner of an automobile.

2. Description of the Background Art

A thrust needle roller bearing is formed of needle rollers, a retainer and a bearing washer, and the needle rollers make line-contact with the bearing washer so that it can achieve a high load capacity and a high rigidity although a bearing projection area is small. Therefore, the thrust needle roller bearings have been widely used as structures for bearing thrust loads in compressors of air conditioners of automobiles. Conditions of use are becoming more severe due to driving with lean lubrication or high-speed rotation.

For example, Japanese Patent Laying-Open No. 2002-70872 has disclosed a conventional thrust needle roller bearing, in which inflow and/or outflow properties of lubricant or lubricating oil are improved for increasing an amount of lubricant supplied per time. This thrust needle roller bearing will now be described with reference to FIGS. 21A–21C.

Referring to FIGS. 21A–21C, a thrust needle roller bearing 50 is formed of a plurality of needle rollers 80 and two annular retainers 60 and 70. Each of two retainers 60 and 70 has a plurality of long windows 61 or 71, each of which is radially longer than roller 80. These plurality of windows 61 and 71 provide roller retaining portions 64 and 74, which retain the plurality of needle rollers 80 in the vertically opposite directions. Each of roller retaining portions 64 and 74 of two retainers 60 and 70 has a radial length 1a shorter than a roller length 1. At least one of two retainers 60 and 70 is bent by appropriate working so that at least one of total thicknesses or vertical lengths t1 and t2 of radially outer and inner portions of retainers 60 and 70 is smaller than a total thickness t0 of roller retaining portions 64 and 74.

Radially outer plate portions 62 and 72 of two retainers 60 and 70 vertically are overlaid with each other, and end portions 67 and 77 of radially inner plate portions 63 and 73 of retainers 60 and 70 are vertically bent to overlap with each other, and are fixed together by caulking effected on end portion 67 of radially inner plate portion 63.

This structure improves the inflow and/or outflow properties of lubricant in at least one of the radially outer and inner portions, which have reduced thicknesses as compared with roller retaining portions 64 and 74, and thereby can increase the amount of lubricant passing through the bearing per time. Further, such a situation is suppressed that retainers 60 and 70 intercept the passing lubricant. Therefore, the lubricant does not remain, and increase in lubricant temperature can be suppressed so that durability of the bearing can be improved.

For ensuring intended strengths of retainers 60 and 70 as well as needle rollers 80 in the thrust needle roller bearing 50, two retainers 60 and 70 as well as needle rollers 80 are made of a cold-rolled steel plate (SPCC). Thus, thrust needle roller bearing 50 is primarily made of iron so that it suffers from a problem of a large weight. Since the weight of thrust needle roller bearing 50 is large, an inertia weight and thus inertia force are large so that a large torque loss occurs, e.g., in an automobile air conditioner or a compressor. This deteriorates the fuel consumption.

Since two retainers 60 and 70 as well as needle rollers 80 are primarily made of iron, large friction unpreferably occurs between needle rollers 80 and two retainers 60 and 70. The large friction between needle rollers 80 and two retainers 60 and 70 increases a required torque and noises during rolling of needle rollers 80.

Further, in the operation of the conventional thrust needle roller bearing 50, a peripheral speed of a raceway surface in contact with needle roller 80 increases as the position moves radially outward in thrust needle roller bearing 50. Therefore, a difference in peripheral speed between needle roller 80 and the raceway surface becomes maximum at the opposite end surfaces of needle roller 80. This tendency increases with increase in relative length of the needle roller with respect to the outer diameter. This peripheral speed difference causes differential sliding on needle roller 80. Thereby, heat is generated from contact portions of needle rollers 80 and the raceway surface so that surface damage (smearing) and/or surface-starting peeling occur. Since these phenomena are liable to occur in the conventional thrust needle roller bearing, it may also suffer from insufficient durability.

SUMMARY OF THE INVENTION

An object of the invention is to provide a thrust needle roller bearing, which is light, can reduce friction between a retainer and needle rollers, and has high durability.

A thrust needle roller bearing according to the invention includes a plurality of needle rollers, and an annular retainer having a plurality of pockets for retaining the needle rollers. The plurality of pockets accommodate the plurality of needle rollers arranged in multiple rows, and the retainer is made of synthetic resin.

According to the thrust needle roller bearing of the invention, since the retainer is made of the synthetic resin, which is much lighter than iron, the thrust needle roller bearing has a lightweight structure. The retainer made of the synthetic resin can ensure a strength required in the retainer. Since a friction coefficient between the iron and the synthetic resin is much smaller than that between iron and iron, friction between the needle roller and the retainer is small (i.e., self-lubricity is good). Thereby, a torque required for rolling the roller can be small. Since metallic sounds due to contact between metal members do not occur during rolling of the needle rollers, noises can be small.

Since the needle rollers are arranged in multiple rows within the retainer, this arrangement reduces a difference in revolution peripheral speed between a radially outer portion and a radially inner portion of the needle roller so that heat generation from contact portions can be suppressed, and the surface damage (smearing) and surface-starting peeling can be prevented. Consequently, the thrust needle roller bearing can have high durability.

Preferably, according to the thrust needle roller bearing of the invention, each of the plurality of pockets accommodates one of the plurality of needle rollers.

Preferably, according to the thrust needle roller bearing of the invention, each of the plurality of pockets accommodates two of the plurality of needle rollers.

Preferably, according to the thrust needle roller bearing of the invention, the plurality of needle rollers are formed of a first group including the needle rollers each accommodated alone in one of the plurality of pockets, and a second group including the needle rollers arranged in the pockets each accommodating two of the needle rollers.

Preferably, according to the thrust needle roller bearing of the invention, the plurality of pockets accommodate the plurality of needle rollers arranged in two rows, and the needle rollers arranged in the row located on the radially inner side of the retainer are equal in number to the needle rollers arranged in the row located on the radially outer side of the retainer.

Preferably, according to the thrust needle roller bearing of the invention, the plurality of pockets accommodate the plurality of needle rollers arranged in two rows, and the needle rollers arranged in the row on the radially inner side of the retainer are smaller in number than the needle rollers arranged in the row on the radially outer side of the retainer.

Preferably, according to the thrust needle roller bearing of the invention, the plurality of pockets accommodate the plurality of needle rollers arranged in two rows, and the needle rollers arranged in the row on the radially inner side of the retainer are larger in number than the needle rollers arranged in the row on the radially outer side of the retainer.

Preferably, according to the thrust needle roller bearing of the invention, the synthetic resin preferably contains glass fibers in polyphenylene sulfide.

Since the polyphenylene sulfide does not hydrolyze owing to its properties, the retainer hardly absorbs moisture when the thrust needle roller bearing is used in an atmosphere having a high moisture content. Therefore, change in size and lowering in strength of the retainer can be prevented. Since the glass fibers have a high mechanical strength, the retainer containing the glass fibers can have an improved strength and an improved heat resistance. The synthetic resin containing the glass fibers in the polyphenylene sulfide can be easily melted by heating, and can be easily solidified by cooling. Therefore, the synthetic resin thus formed can be suitably used for manufacturing the retainer by injection molding. Since the synthetic resin containing the glass fibers in the polyphenylene sulfide has good resistances against chemicals and oil, the thrust needle roller bearing can be used in an atmosphere containing chemicals or oil, which may adhere thereto.

Preferably, according to the thrust needle roller bearing of the invention, each of end surfaces of the plurality of needle rollers is an F end surface having a surface precision of 30 μm or less.

This structure remarkably reduces a frictional resistance between the roller and the retainer as well as the frictional resistance between the neighboring rollers, and thus suppresses drilling friction, which may be caused by friction due the contact between such members. The drilling friction means an abnormal friction, which is caused by such operations that a centrifugal force pushes the end surface of the needle roller against a wall surface of the pocket in the retainer, and the rotation of each needle roller about its own axis further causes the contact of the needle roller.

Preferably, the thrust needle roller bearing of the invention is used as a bearing structure bearing a thrust load of a compressor in an air conditioner of an automobile.

The thrust needle roller bearing in the bearing structure, which bears the thrust load of the compressor in the air conditioner of the automobile, is used under severe conditions such as driving with lean lubrication or high-speed rotation. Therefore, the thrust needle roller bearing according to the invention can be suitably used because it is light, and can suppress friction between the retainer and the needle rollers.

In the description, the expression of "multiple rows" means such an arrangement that includes a plurality of groups each including the rollers, which are located at an equal distance from a center of the annular retainer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings.

(First Embodiment)

Figure 1:
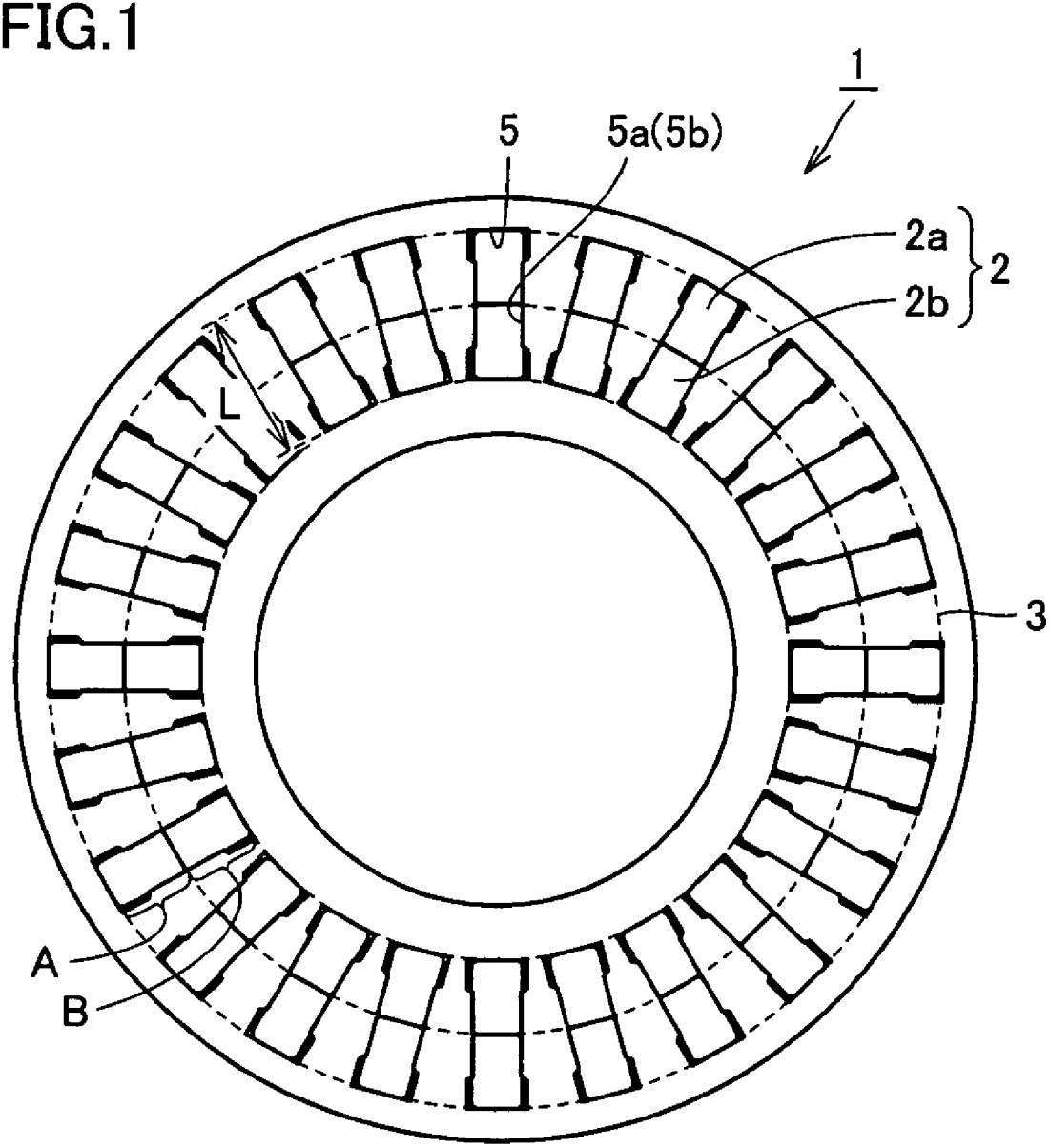
FIG. 1 is a plan showing a thrust needle roller bearing according to a first embodiment of the invention.
Figure 2:
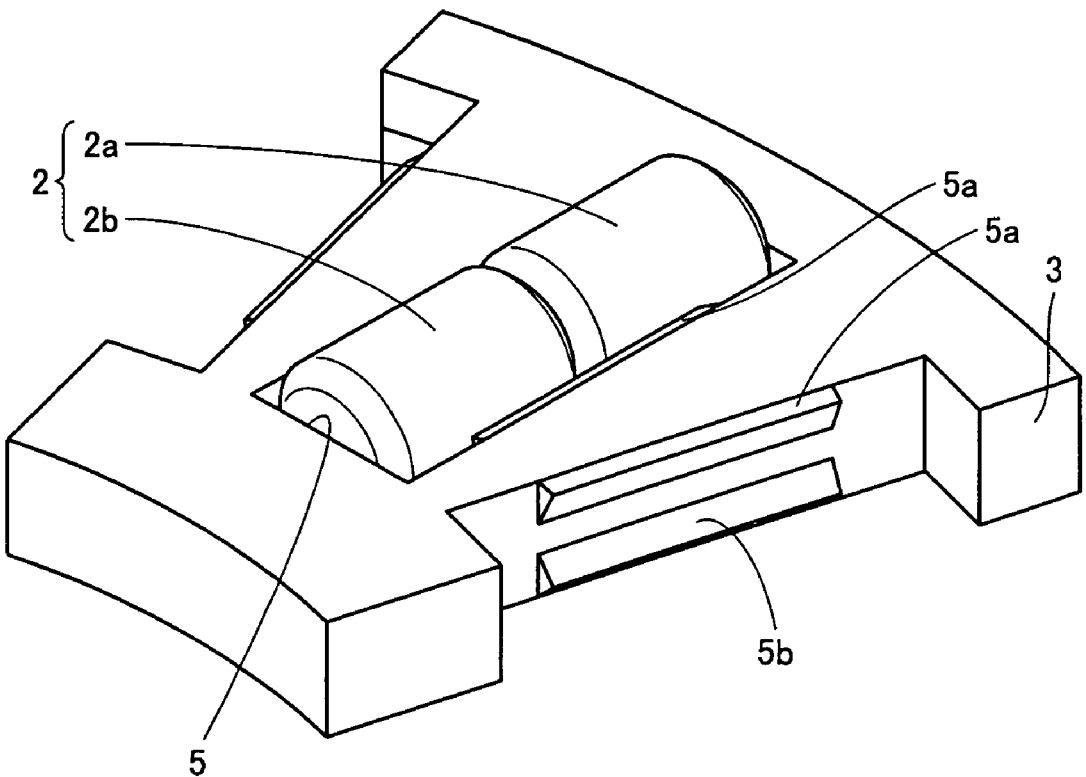
FIG. 2 is a perspective view of a major portion in FIG. 1.
Figure 3:
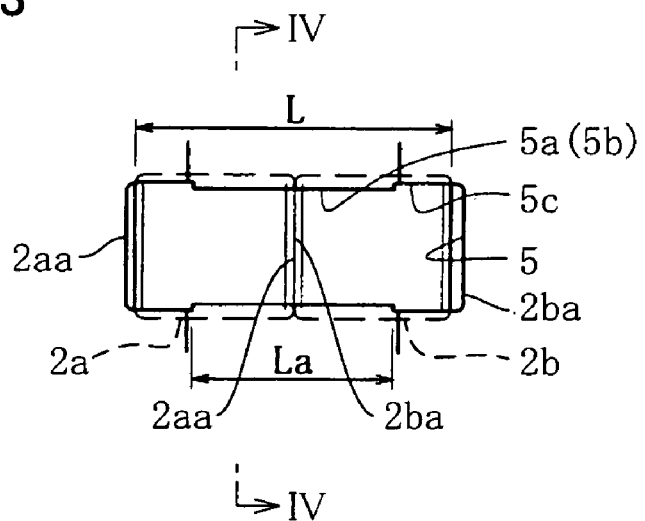
FIG. 3 is a plan showing, on an enlarged scale, a pocket portion in FIG. 1.
Figure 4:
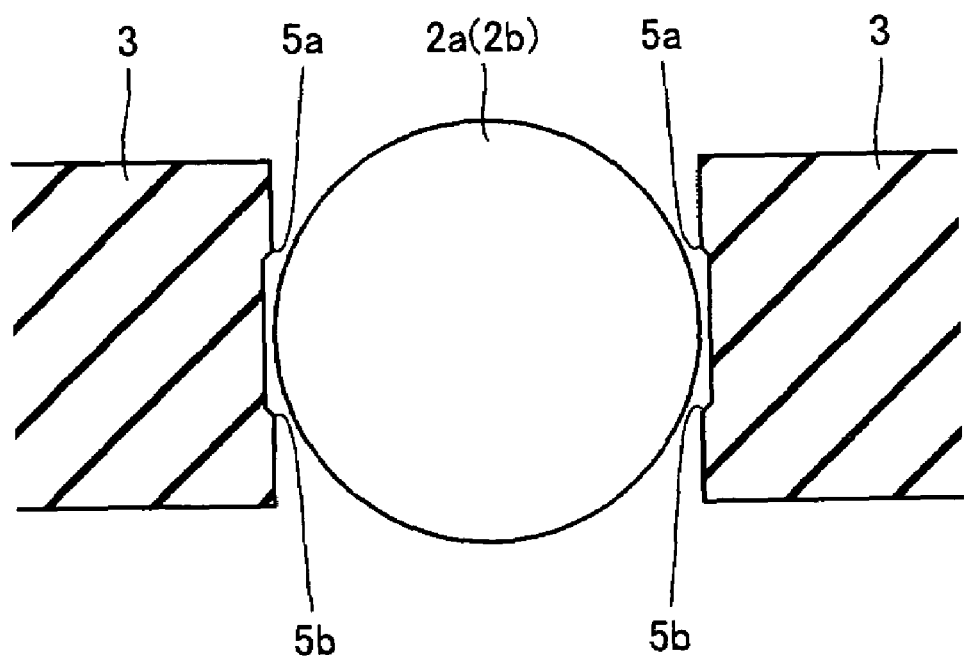
FIG. 4 is a cross section taken along line IV—IV in FIG. 3.

Referring to FIGS. 1 and 2, a thrust needle roller bearing 1 is formed of a plurality of needle rollers 2 and an annular retainer 3 retaining needle rollers 2 at positions spaced from each other with predetermined circumferential pitches. Retainer 3 has a plurality of rectangular pockets 5 each having a length longer than a radial length L (i.e., length in the radial direction of bearing 2) of needle roller 2. On each of opposite side edges of each packet 5, roller retaining portions 5a and 5b are formed and projected toward the other sides, respectively. These roller retaining portions 5a and 5b retain needle roller 2.

Referring to FIGS. 1 to 4, the plurality of needle rollers 2 are accommodated in the plurality of pockets 5, and are arranged in multiple (two) rows. Each pocket 5 accommodates two needle rollers 2, which are aligned to each other in the radial direction of retainer 3. Among needle rollers 2 arranged in the two rows, needle rollers 2b in the row on the radially inner side of retainer 3 (i.e., in the row within a region B defined by dotted line in FIG. 1) are equal in number to needle rollers 2a in the row on the radially outer side of retainer 3 (i.e., in the row within a region A defined by dotted line in FIG. 1). In this embodiment, needle rollers 2a and 2b have the same length. Depending on the working conditions, radially outer needle roller 2a may be longer than radially inner needle roller 2b, or may be shorter than it. For example, the radially inner or outer needle roller may be longer by 1.2 times than the other so that the radially outer load capacity may be increased.

A radial length La of roller retaining portions 5a and 5b is shorter than roller length L so that lubricant can easily flow through concavities 5c formed on the opposite sides of each of roller retaining portions 5a and 5b.

Figure 5:
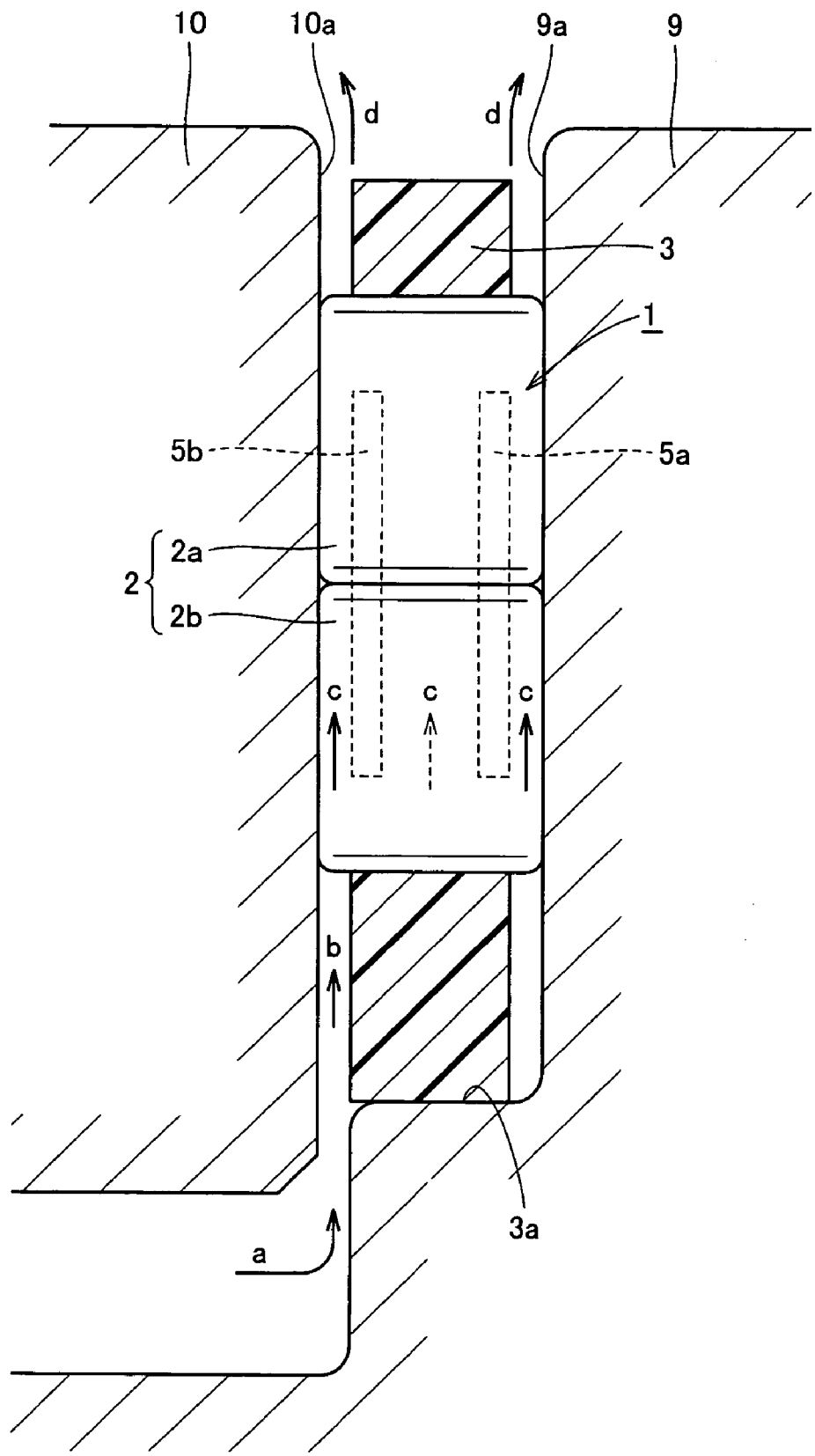
FIG. 5 is a fragmentary cross section illustrating a practical state of the thrust needle roller bearing according to a first embodiment of the invention.

Referring to FIG. 5, thrust needle roller bearing 1 having the above structure is arranged in a loose fitting fashion such that needle rollers 2 can roll between a raceway surface 9a of a first shaft (rotary shaft) 9 and a raceway surface 10a of a second shaft (stationary shaft) 10, and a radially inner end 3a of retainer 3 provides a guide surface. When first shaft 9 rotates, retainer 3 rotates together with first shaft 9, and needle rollers 2 roll between raceway surface 9a of first shaft 9 and raceway surface 10a of second shaft 10. A hydraulic pressure source (not shown) supplies the lubricant through an oil passage into thrust needle roller bearing 1.

The lubricant flows through the passage as indicated by an arrow a, and then flows through a portion, which is located between raceway surface 10a of second shaft 10 and a portion located radially inside lower roller retaining portion 5b of retainer 3, as indicated by an arrow b. Then, the lubricant flows through spaces defined around needle rollers 2 by retainer 3 as indicated by arrows c, and lubricates the side surfaces of needle rollers 2 and roller retaining portions 5a and 5b of retainer 3 opposed thereto as well as the end surfaces of needle rollers 2 and raceway surfaces 9a and 10a opposed to the side surfaces of needle rollers 2. The lubricant is then discharged as indicated by arrows d through a space between raceway surface 10a of second shaft 10 and the portion of retainer 3 radially outside roller retaining portion 5b, and through a space between the raceway surface 9a of first shaft 9 and the portion of retainer 3 radially outside roller retaining portion 5a.

Referring to FIG. 1, retainer 3 in this embodiment is made of synthetic resin, and is preferably formed of synthetic resin containing glass fibers in polyphenylene sulfide. This retainer 3 is produced, e.g., in the following method.

First, synthetic resin to be used as a material of retainer 3 is prepared. For using the synthetic resin containing the glass fibers in the polyphenylene sulfide as the material, compounding of the polyphenylene sulfide and the glass fibers is performed by an extruder to produce the synthetic resin containing the glass fibers in the polyphenylene sulfide. Then, the retainer is formed by performing injection molding with the synthetic resin, i.e., the material of the retainer.

More specifically, the synthetic resin melted by heating is injected into dies, and then is cooled to solidify so that molded retainer 3 is produced. Instead of the above manufacturing method, retainer 3 may be produced, e.g., by shaving a blank (a rod or a circular plate) of the synthetic resin into an appropriate form of retainer 3.

In thrust needle roller bearing 1 of this embodiment, each of end surfaces 2aa and 2ba (FIG. 3) of needle rollers 2a and 2b is an F end surface, and has an end surface precision not exceeding 30 µm. The "F end surface" means a form (plane form) indicated by a symbol "F" according to JIS (Japanese Industrial Standards).

Figure 6A:
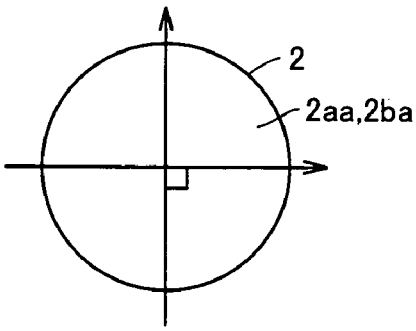
FIG. 6A is a diagram illustrating a method of measuring an end surface precision.
Figure 6B:
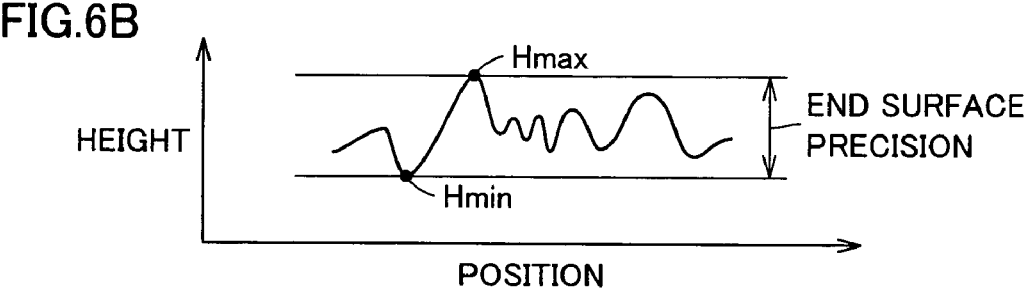
FIG. 6B illustrates a relationship between results of measurement and the end surface precision.

Description will now be given on a method of measuring the end surface precision. Referring to FIG. 6A, changes in height of needle roller 2 are measured at end surfaces 2aa and 2ba. This measurement is performed in diametral directions of end surfaces 2aa and 2ba as indicated by arrows in FIG. 6A, and the measurement on each end surface 2aa or 2ba is performed two times in directions perpendicular to each other, respectively. FIG. 6B illustrates the changes in height thus measured. From these changes, a maximum value (Hmax) and a minimum value (Hmin) of the height of each of end surfaces 2aa and 2ba are extracted, and a difference between values Hmax and Hmin is obtained as the end surface precision. For example, Talysurf manufactured by Taylor Hobson Ltd. is used as a device for measuring the end surface precision.

The inventors of the present invention and others considered that drilling wearing and large bearing sounds are both caused by the following reasons in the conventional thrust needle roller bearing. Since each of needle rollers 2a and 2b arranged in thrust needle roller bearing 1 has an end surface precision having a large value, a large resistance occurs on the contact portions of needle roller 2a and the opposite portions (i.e., needle roller 2b and retainer 3) so that the friction caused by the impact of these portions causes the drilling friction, and also causes sounds resulting in large bearing noises. Accordingly, a relationship of end surface precision of needle rollers 2a and 2b in thrust needle roller bearing 1 with respect to the bearing sound was determined.

The sound measurement was performed under such conditions that a rotation speed of the thrust needle roller bearing is 1800 rpm, a load is 100 N, and a microphone is located at an angular position of 45 degrees with respect to a normal to the major surface of the retainer, and is spaced by a distance of 100 mm from the thrust needle roller bearing.

Figure 7:
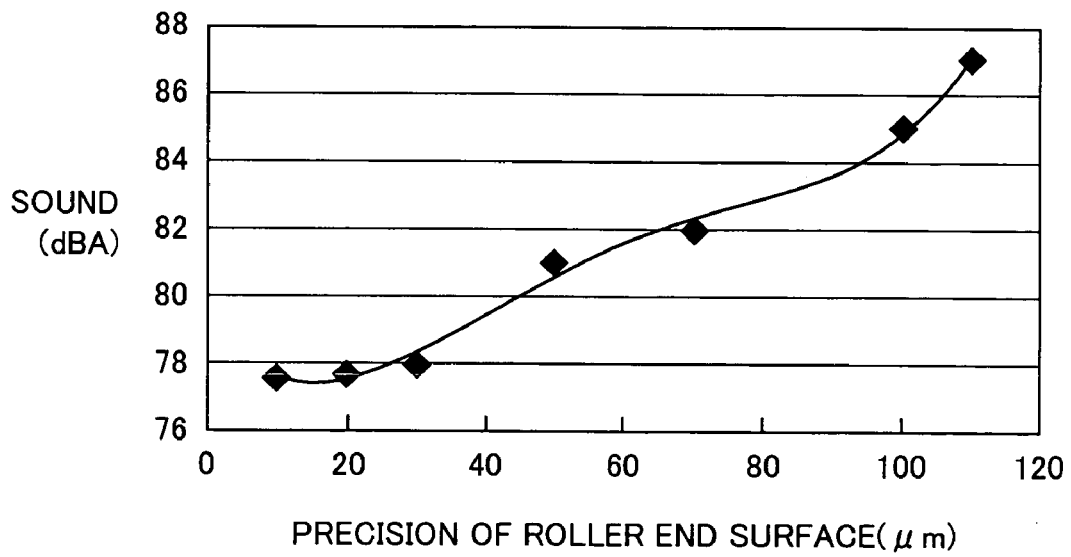
FIG. 7 is a graph illustrating a relationship of end surface precision of needle rollers $2a$ and $2b$ with respect to bearing sounds in the thrust needle roller bearing.

As can be seen from FIG. 7, the bearing sounds increase to or above 81 dBA if the end surface precision of the needle roller is 50 µm or more, and decreases to a remarkably small value of 78 dBA or less if the precision does not exceed 30 µm. This is for the following reasons. If the end surface of the needle roller has the precision of 30 µm or less, a frictional resistance between the neighboring needle rollers and a frictional resistance between the needle roller and the retainer are remarkably small. Thus, the needle roller having the end surface precision of 30 µm or less remarkably reduces the frictional resistance so that drilling friction hardly occurs.

In thrust needle roller bearing 1 of the embodiment, therefore, each of needle rollers 2a and 2b has the end surface precision of 30 µm or less so that the friction resistance between needle rollers 2a and 2b as well as the frictional resistance between retainer 3 and needle rollers 2a and 2b are small. Thereby, the drilling friction due to the friction by contact between these portions hardly occurs, and the bearing sounds caused by the contact between them can be particularly small.

Members such as needle rollers 2a and 2b are generally formed by shaping the end surfaces and then grinding an outer peripheral surface in a usual manner, or by grinding the outer peripheral surface in a usual manner and then effecting secondary working such as wire-cut electric spark machining on the end surfaces. Thereby, needle rollers 2a and 2b have the end surface precision of 30 μm or less. The wire-cut electric spark machining is a manner of cutting a work with an electrode formed of an electrically conductive wire of a small diameter.

According to thrust needle roller bearing 1 of the embodiment, since retainer 3 is made of the synthetic resin much lighter than iron, thrust needle roller bearing 1 can be light. Since retainer 3 is made of the synthetic resin, a required strength of retainer 3 can be ensured. Since a friction coefficient between iron and synthetic resin is much smaller than that between iron and iron, friction between needle roller 2 and retainer 3 can be small (i.e., self-lubricity can be good). Thereby, a torque required for rolling needle rollers 2 can be small, and needle rollers 2 can roll without causing a sound, which is generally caused by contact between metal members, so that noises can be small.

Since needle rollers 2 are arranged in multiple rows, this can reduce a difference in revolution peripheral speed between the radially outer portion and the radially inner portion so that sliding on the raceway surface is suppressed. Therefore, heat generating from the contact portions can be small, and the surface damage (smearing) and the surface-starting peeling can be prevented. Consequently, thrust needle roller bearing 1 can have improved durability.

In thrust needle roller bearing 1 of the embodiment, the synthetic resin contains the glass fibers in the polyphenylene sulfide.

Since the polyphenylene sulfide does not hydrolyze owing to its properties, the retainer hardly absorbs moisture when the thrust needle roller bearing is used in an atmosphere having a high moisture content. Therefore, change in size and lowering in strength of retainer 3 can be prevented. Since the glass fibers have a high mechanical strength, retainer 3 containing the glass fibers can have an improved strength and an improved heat resistance. Since the synthetic resin containing the glass fibers in the polyphenylene sulfide can be easily melted by heating, and can be easily solidified by cooling, the synthetic resin thus formed can be suitably used for manufacturing retainer 3 by injection molding. Since the synthetic resin containing the glass fibers in the polyphenylene sulfide has good resistances against chemicals and oil, thrust needle roller bearing 1 can be used in an atmosphere containing chemicals or oil, which may adhere thereto.

According to thrust needle roller bearing 1 of the embodiment, each of end surfaces of the plurality of needle rollers 2 is the F end surface having the surface precision of 30 μm or less.

This structure remarkably reduces a frictional resistance between neighboring needle rollers 2a and 2b as well as the frictional resistance between retainer 3 and needle rollers 2a and 2b, and thus suppresses drilling friction, which may be caused by friction due the contact between such members. Also, the bearing sounds due to the sounds caused by such contact can be particularly small.

Thrust needle roller bearing 1 of the embodiment can be suitably used as a bearing structure bearing a thrust load of a compressor for an air conditioner of an automobile, which is used under severe conditions such as driving with lean lubrication or high-speed rotation.

(Second Embodiment)

Figure 8:
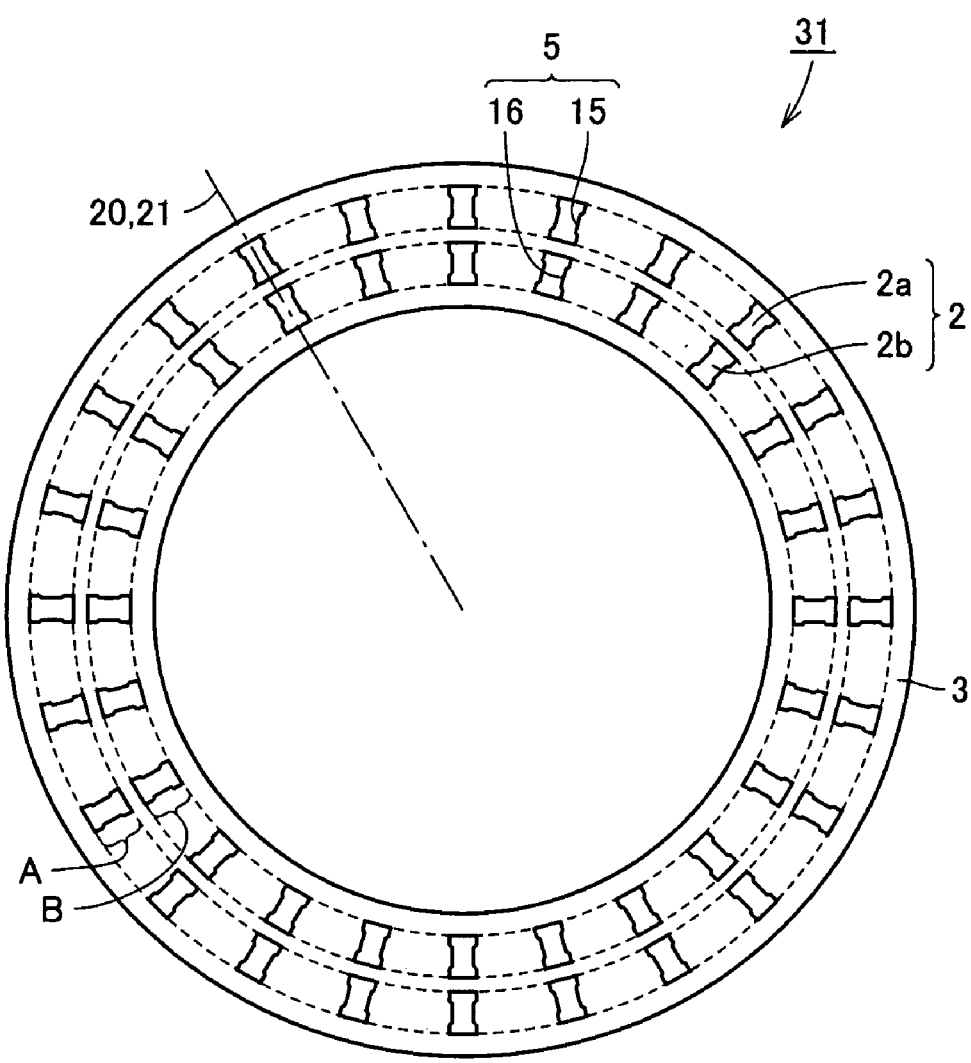
FIG. 8 is a plan showing a thrust needle roller bearing according to a second embodiment of the invention.

Referring to FIG. 8, a thrust needle roller bearing 31 according to a second embodiment includes retainer 3 having the plurality of pockets 5 arranged in two rows. Each pocket 5 accommodates one needle roller 2. Thus, the plurality of needle rollers 2 are arranged in the plurality of pockets 5 in a one-to-one relationship, and are arranged in multiple (two) rows. Among the plurality of pockets 5 arranged in two rows, pockets 16 in the row on the radially inner side of retainer 3 (i.e., in the row within region B defined by dotted line in FIG. 8) accommodate respective needle rollers 2b, which are equally spaced from each other, and pockets 15 in the row on the radially outer side of retainer 3 (i.e., in the row within region A defined by dotted line in FIG. 8) accommodate respective needle rollers 2a, which are equally spaced from each other. Needle rollers 2a are equal in number to needle rollers 2b.

In this embodiment, pockets 15 and 16 are formed such that a center line 20 of pocket 15, which extends in a radial direction of retainer 3 through a circumferential center of pocket 15 (and will be merely referred to as "center line 20 of pocket 15" hereinafter), matches with a center line 21 of pocket 16, which extends in a radial direction of retainer 3 through a circumferential center of pocket 15 (and will be merely referred to as "center line 21 of pocket 15" hereinafter).

Structures of thrust needle roller bearing 31 other than the above are substantially the same as those of thrust needle roller bearing 1 of the first embodiment shown in FIGS. 1 to 5. Therefore, the same members bear the same reference numbers, and description thereof is not repeated.

As described above, thrust needle roller bearing 31 of this embodiment differs from thrust needle roller bearing 1 of the first embodiment in position of needle rollers 2 and position of pockets 5. The structure of this embodiment can achieve the effect similar to that of the first embodiment.

(Third Embodiment)

In thrust needle roller bearing 31 of the second embodiment, pockets 15 and 16 are formed such that center line 20 of pocket 15 matches with center line 21 of pocket 16. However, the thrust needle roller bearing according to the invention may have another structure as shown in FIG. 9.

Figure 9:
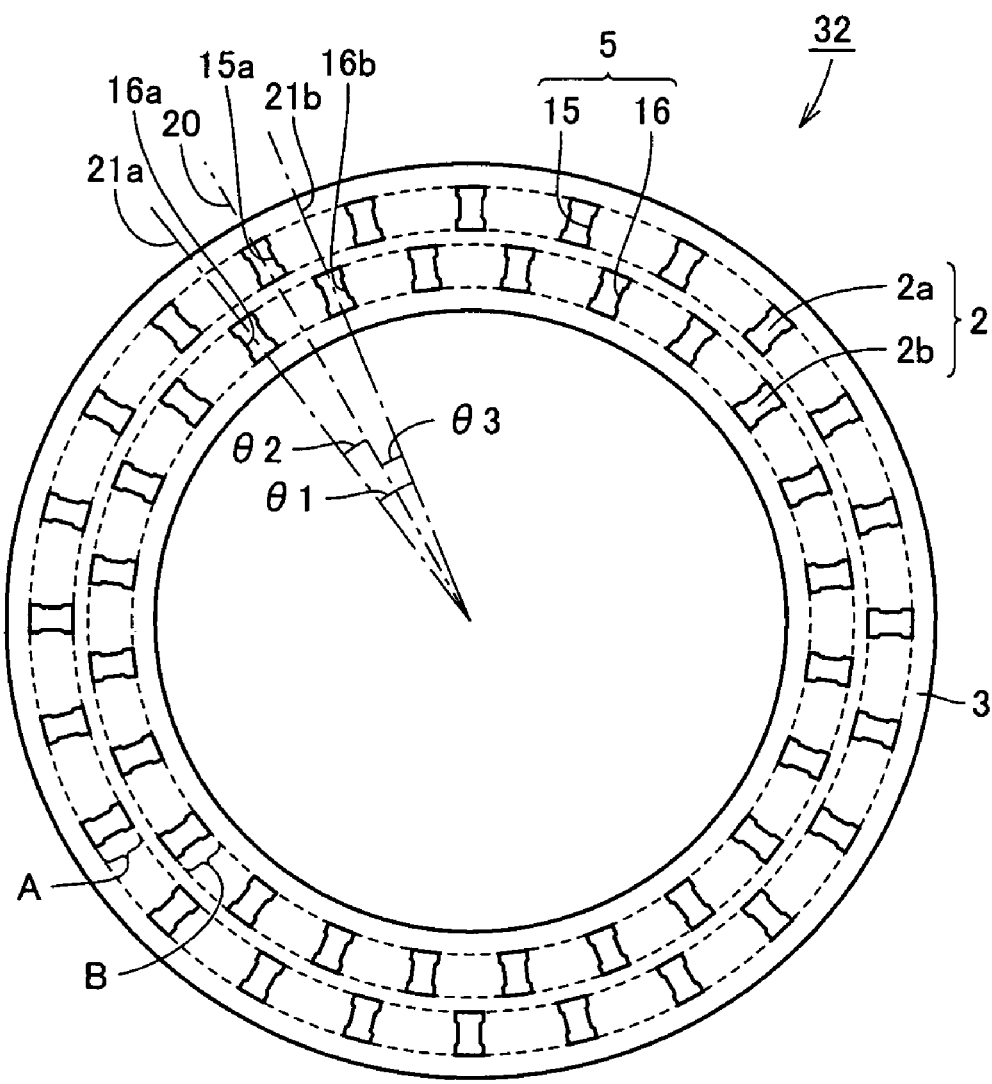
FIG. 9 is a plan showing a thrust needle roller bearing according to a third embodiment of the invention.

FIG. 9 shows center line 20 of one pocket 15a among the plurality of pockets 15. Pockets 16a and 16b located in the row on the radially inner side of retainer 3 are arranged on the circumferentially opposite sides of each pocket 15a. FIG. 9 also shows center lines 21a and 21b of two pockets 16a and 16b, which are closer to one pocket 15a than other pockets 16. In a thrust needle roller bearing 32 according to this embodiment, pockets 15 and 16 are formed such that center line 20 equally divides an angle θ1 defined between center lines 21a and 21b. In other words, pockets 15 and 16 are formed such that an angle θ2 defined between center lines 21a and 20 is equal to an angle θ3 defined between center lines 21b and 20.

Structures of thrust needle roller bearing 32 other than the above are substantially the same as those of thrust needle roller bearing 31 of the second embodiment shown in FIG. 8. Therefore, the same members bear the same reference numbers, and description thereof is not repeated.

Figure 10:
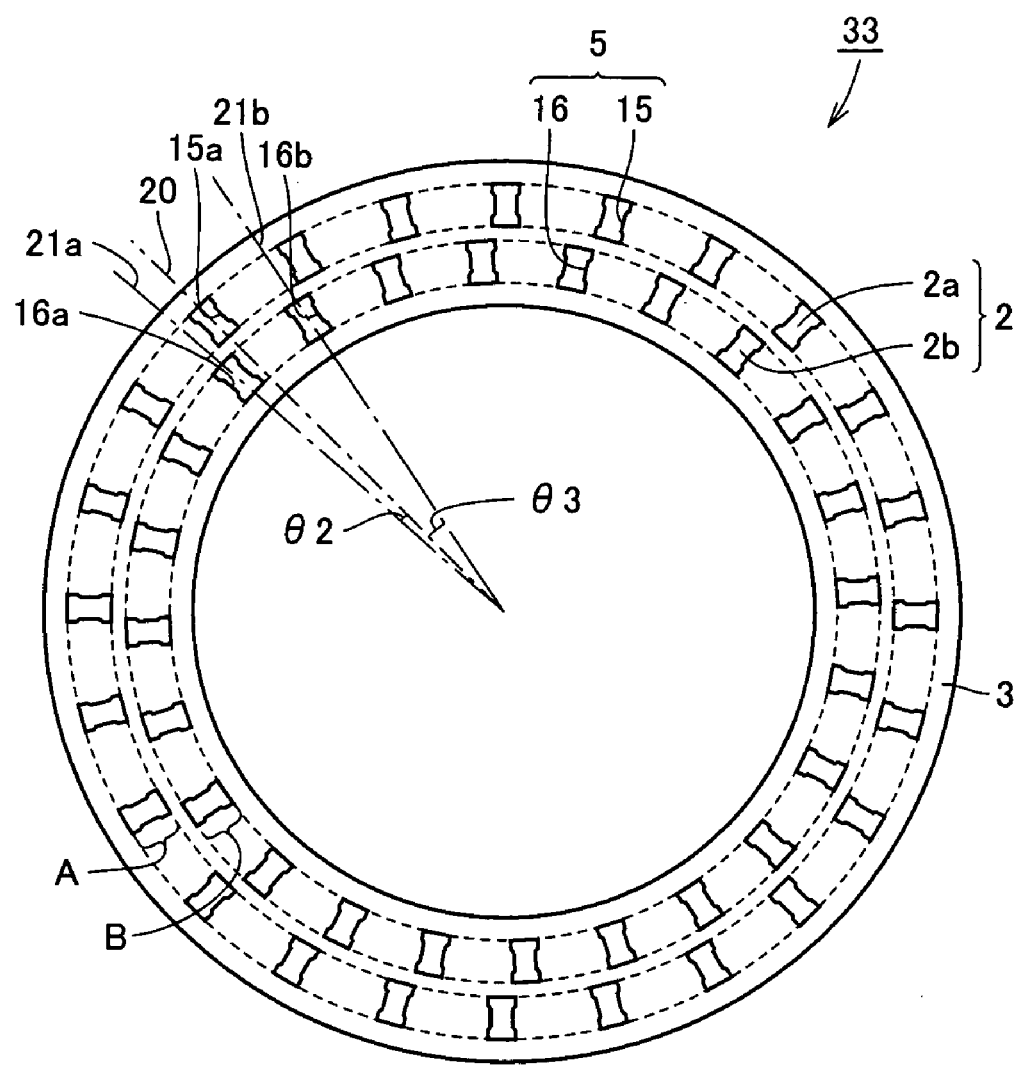
FIG. 10 is a plan showing another thrust needle roller bearing according to a third embodiment of the invention.

The thrust needle roller bearing according to the invention may have a structure shown in FIG. 10.

Referring to FIG. 10, a thrust needle roller bearing 33 has pockets 15 and 16, which are formed such that angle θ2 defined between center lines 21a and 20 is not equal to angle θ3 between center lines 21b and 20.

As described above, thrust needle roller bearings 32 and 33 of this embodiment differ from thrust needle roller bearing 31 of the second embodiment in position of needle rollers 2 and position of pockets 5. The structures of this embodiment can achieve the effect similar to that of the second embodiment.

(Fourth Embodiment)

Figure 11:
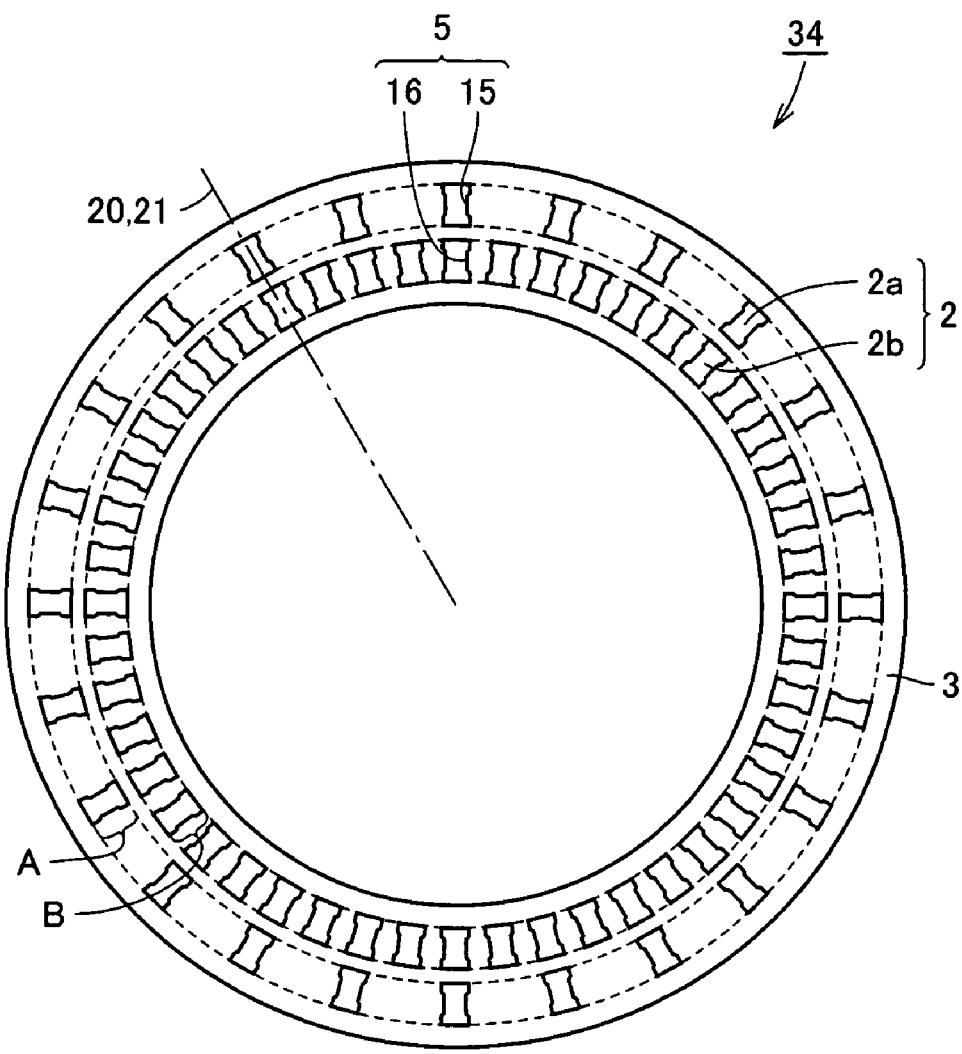
FIG. 11 is a plan showing a thrust needle roller bearing according to a fourth embodiment of the invention.

Referring to FIG. 11, a thrust needle roller bearing 34 of a fourth embodiment includes retainer 3, which has the plurality of pockets 5 arranged in two rows. Each pocket 5 accommodates only one of needle rollers 2. Thus, the plurality of pockets 5 accommodate the plurality of needle rollers 2 arranged in multiple (two) rows. Among the plurality of pockets 5 arranged in two rows, pockets 16 in the row on the radially inner side of retainer 3 (i.e., in the row within region B defined by dotted line in FIG. 11) accommodate respective needle rollers 2b, which are equally spaced from each other, and pockets 15 in the row on the radially outer side of retainer 3 (i.e., in the row within region A defined by dotted line in FIG. 11) accommodate respective needle rollers 2a, which are equally spaced from each other. Needle rollers 2a are smaller in number than needle rollers 2b.

In this embodiment, pockets 15 and 16 are formed such that center line 20 of pocket 15 matches with center line 21 of pocket 16.

Structures of thrust needle roller bearing 34 other than the above are substantially the same as those of thrust needle roller bearing 1 of the first embodiment shown in FIGS. 1 to 5. Therefore, the same members bear the same reference numbers, and description thereof is not repeated.

As described above, thrust needle roller bearing 34 of this embodiment differs from thrust needle roller bearing 1 of the first embodiment in position of needle rollers 2 and position of pockets 5. The structures of this embodiment can achieve the effect similar to that of the first embodiment.

(Fifth Embodiment)

In thrust needle roller bearing 34 of the fourth embodiment, pockets 15 and 16 are formed such that center line 20 of pocket 15 matches with center line 21 of pocket 16. However, the thrust needle roller bearing according to the invention may have another structure as shown in FIG. 12.

Figure 12:
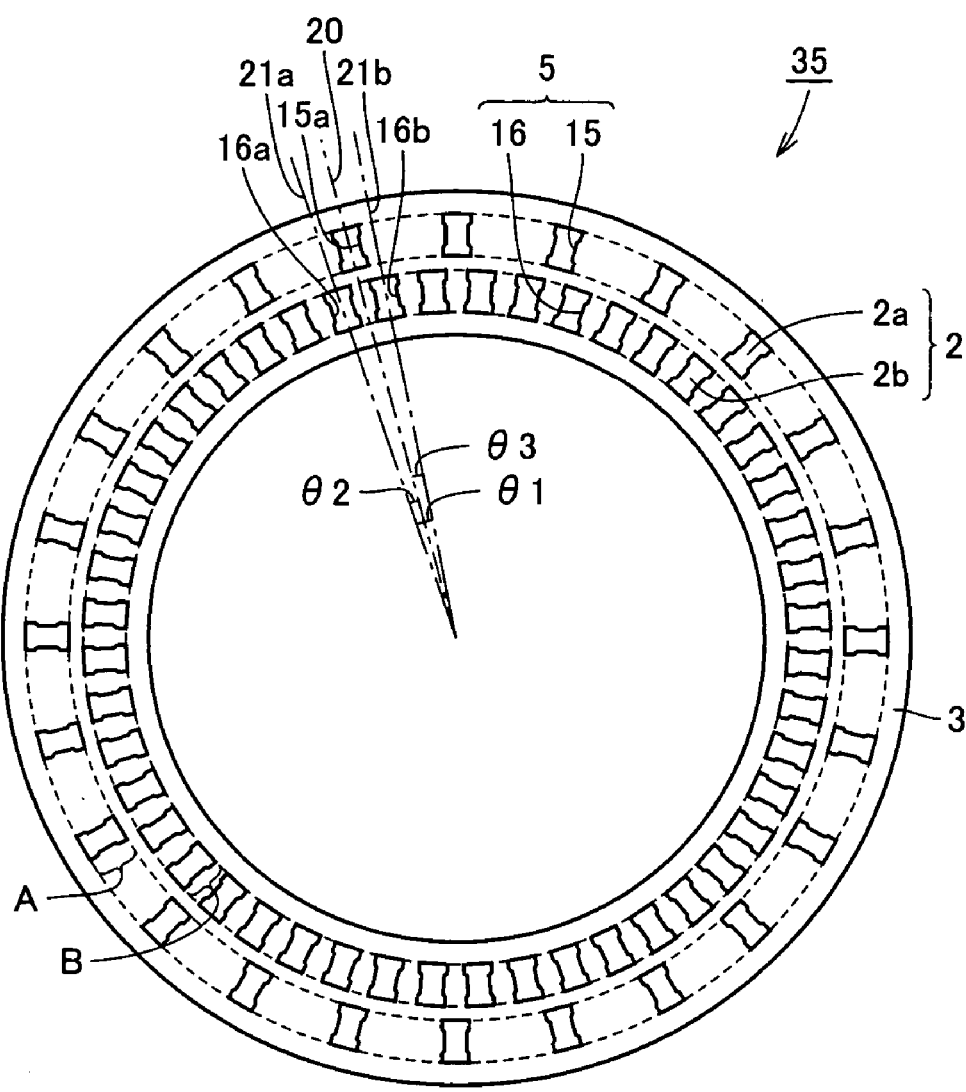
FIG. 12 is a plan showing a thrust needle roller bearing according to a fifth embodiment of the invention.

FIG. 12 shows center line 20 of one pocket 15a among the plurality of pockets 15. Pockets 16a and 16b located in the row on the radially inner side of retainer 3 are arranged on the circumferentially opposite sides of each pocket 15a. FIG. 12 also shows center lines 21a and 21b of two pockets 16a and 16b, which are closer to one pocket 15a than other pockets 16. In a thrust needle roller bearing 35 according to this embodiment, pockets 15 and 16 are formed such that center line 20 equally divides angle θ1 defined between center lines 21a and 21b. In other words, pockets 15 and 16 are formed such that angle θ2 defined between center lines 21a and 20 is equal to angle θ3 defined between center lines 21b and 20.

Structures of thrust needle roller bearing 35 other than the above are substantially the same as those of thrust needle roller bearing 34 of the fourth embodiment shown in FIG. 11. Therefore, the same members bear the same reference numbers, and description thereof is not repeated.

Figure 13:
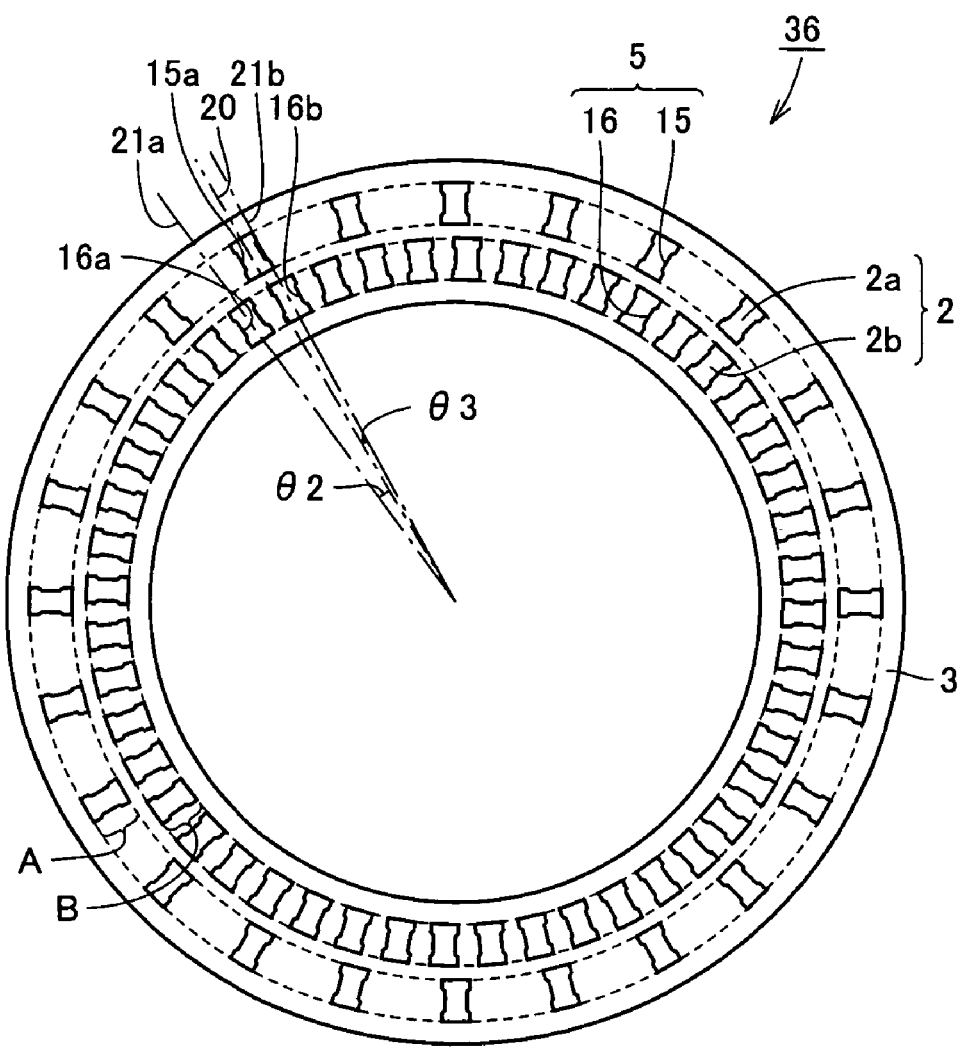
FIG. 13 is a plan showing another thrust needle roller bearing according to a fifth embodiment of the invention.

The thrust needle roller bearing according to the invention may have a structure shown in FIG. 13.

Referring to FIG. 13, a thrust needle roller bearing 36 has pockets 15 and 16, which are formed such that angle θ2 defined between center lines 21a and 20 is not equal to angle θ3 between center lines 21b and 20.

As described above, thrust needle roller bearings 35 and 36 of this embodiment differ from thrust needle roller bearing 34 of the fourth embodiment in position of needle rollers 2 and position of pockets 5. The structures of this embodiment can achieve the effect similar to that of the fourth embodiment.

(Sixth Embodiment)

Figure 14:
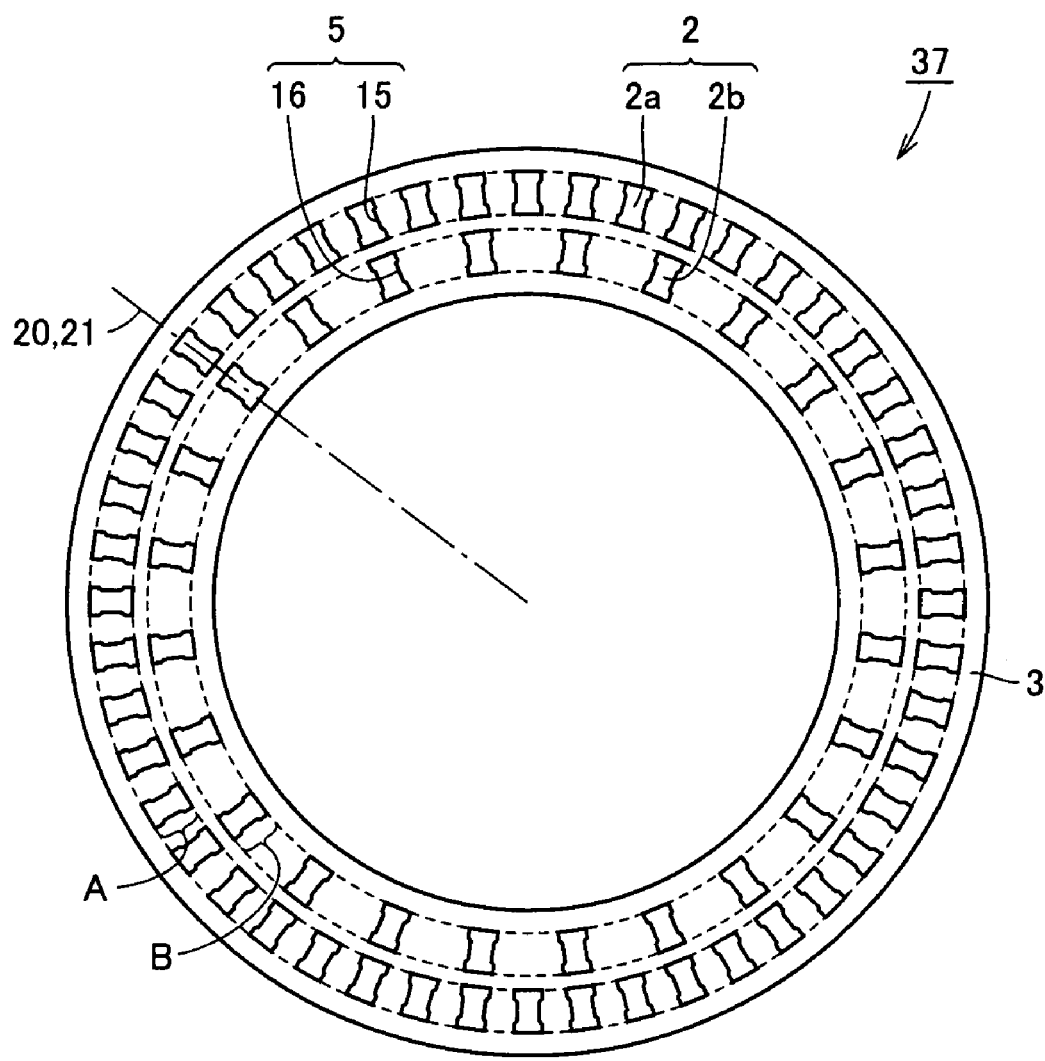
FIG. 14 is a plan showing a thrust needle roller bearing according to a sixth embodiment of the invention.

Referring to FIG. 14, a thrust needle roller bearing 37 of a sixth embodiment includes retainer 3, which has the plurality of pockets 5 arranged in two rows. Each pocket 5 accommodates only one of needle rollers 2. Thus, the plurality of pockets 5 accommodate the plurality of needle rollers 2 arranged in multiple (two) rows. Among the plurality of pockets 5 arranged in two rows, pockets 16 in the row on the radially inner side of retainer 3 (i.e., in the row within region B defined by dotted line in FIG. 14) accommodate respective needle rollers 2b, which are equally spaced from each other, and pockets 15 in the row on the radially outer side of retainer 3 (i.e., in the row within region A defined by dotted line in FIG. 14) accommodate respective needle rollers 2a, which are equally spaced from each other. Needle rollers 2a are larger in number than needle rollers 2b.

In this embodiment, pockets 15 and 16 are formed such that center lines 20 of predetermined pockets 15 match with center lines 21 of pockets 16, respectively.

Structures of thrust needle roller bearing 37 other than the above are substantially the same as those of thrust needle roller bearing 1 of the first embodiment shown in FIGS. 1 to 5. Therefore, the same members bear the same reference numbers, and description thereof is not repeated.

As described above, thrust needle roller bearing 37 of this embodiment differs from thrust needle roller bearing 1 of the first embodiment in position of needle rollers 2 and position of pockets 5. The structures of this embodiment can achieve the effect similar to that of the first embodiment.

(Seventh Embodiment)

In thrust needle roller bearing 37 of the sixth embodiment, pockets 15 and 16 are formed such that center lines 20 of predetermined pockets 15 match with center lines 21 of pockets 16, respectively. However, the thrust needle roller bearing according to the invention may have another structure as shown in FIG. 15.

Figure 15:
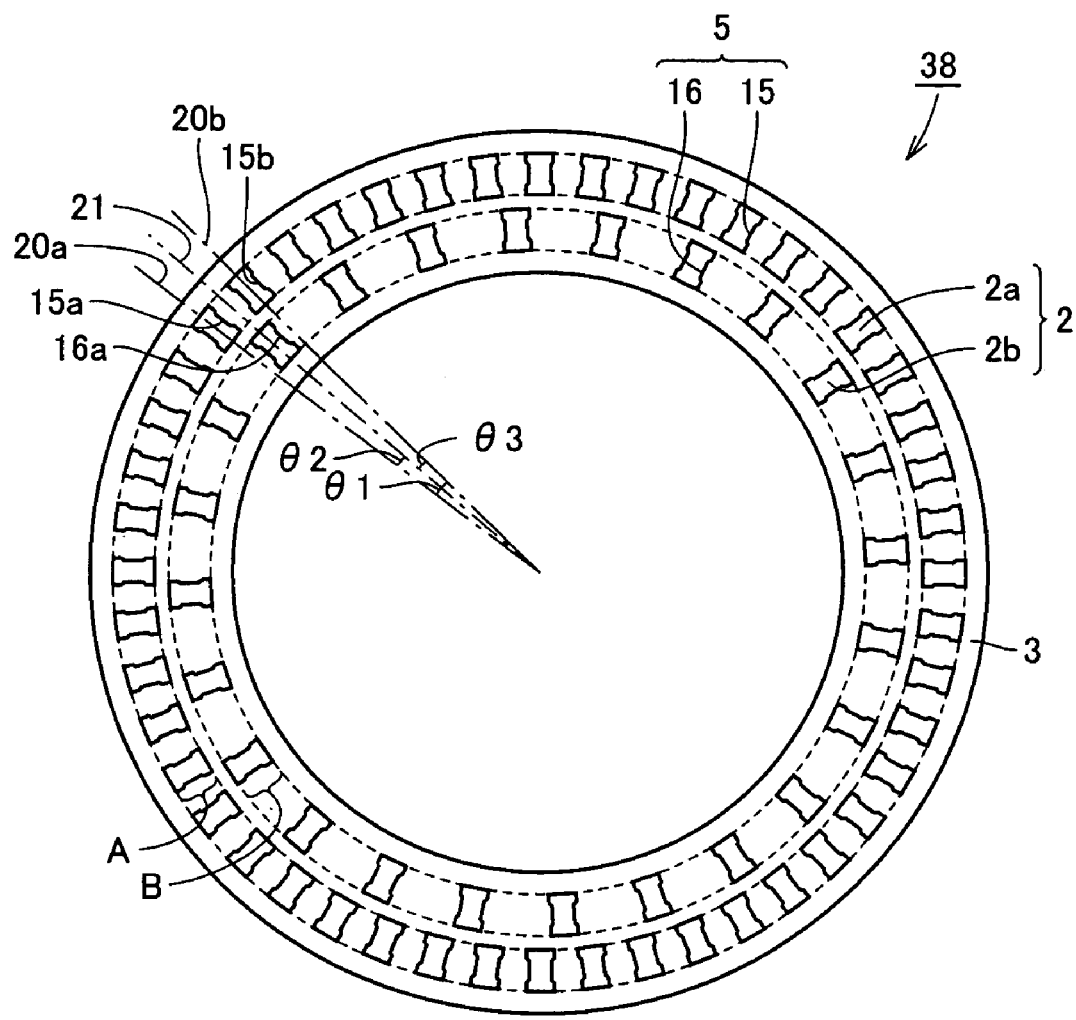
FIG. 15 is a plan showing a thrust needle roller bearing according to a seventh embodiment of the invention.

FIG. 15 shows center line 21 of one pocket 16a among the plurality of pockets 16. Pockets 15a and 15b located in the row on the radially outer side of retainer 3 are arranged on the circumferentially opposite sides of each pocket 16a. FIG. 15 also shows center lines 20a and 20b of two pockets 15a and 15b, which are closer to one pocket 16a than other pockets 16. In a thrust needle roller bearing 38 according to this embodiment, pockets 15 and 16 are formed such that center line 21 equally divides angle θ1 defined between center lines 20a and 20b. In other words, pockets 15 and 16 are formed such that angle θ2 defined between center lines 20a and 21 is equal to angle θ3 defined between center lines 20b and 21.

Structures of thrust needle roller bearing 38 other than the above are substantially the same as those of thrust needle roller bearing 37 of the sixth embodiment shown in FIG. 14. Therefore, the same members bear the same reference numbers, and description thereof is not repeated.

Figure 16:
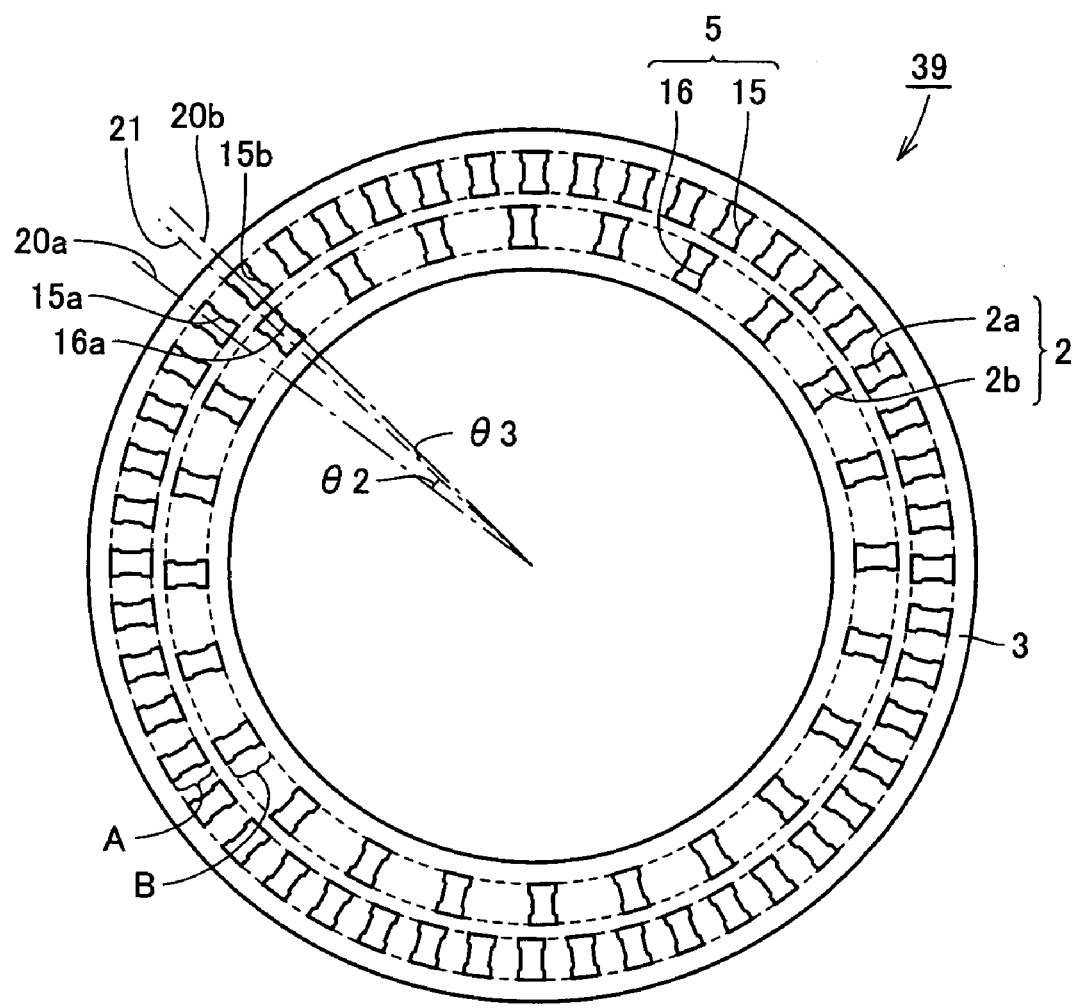
FIG. 16 is a plan showing another thrust needle roller bearing according to a seventh embodiment of the invention.

The thrust needle roller bearing according to the invention may have a structure shown in FIG. 16.

Referring to FIG. 16, a thrust needle roller bearing 39 has pockets 15 and 16, which are formed such that angle θ2 defined between center lines 21*a* and 20 is not equal to angle θ3 between center lines 21*b* and 20.

As described above, thrust needle roller bearings 38 and 39 of this embodiment differ from thrust needle roller bearing 37 of the sixth embodiment in position of needle rollers 2 and position of pockets 5. The structures of this embodiment can achieve the effect similar to that of the sixth embodiment.

(Eighth Embodiment)

Figure 17:
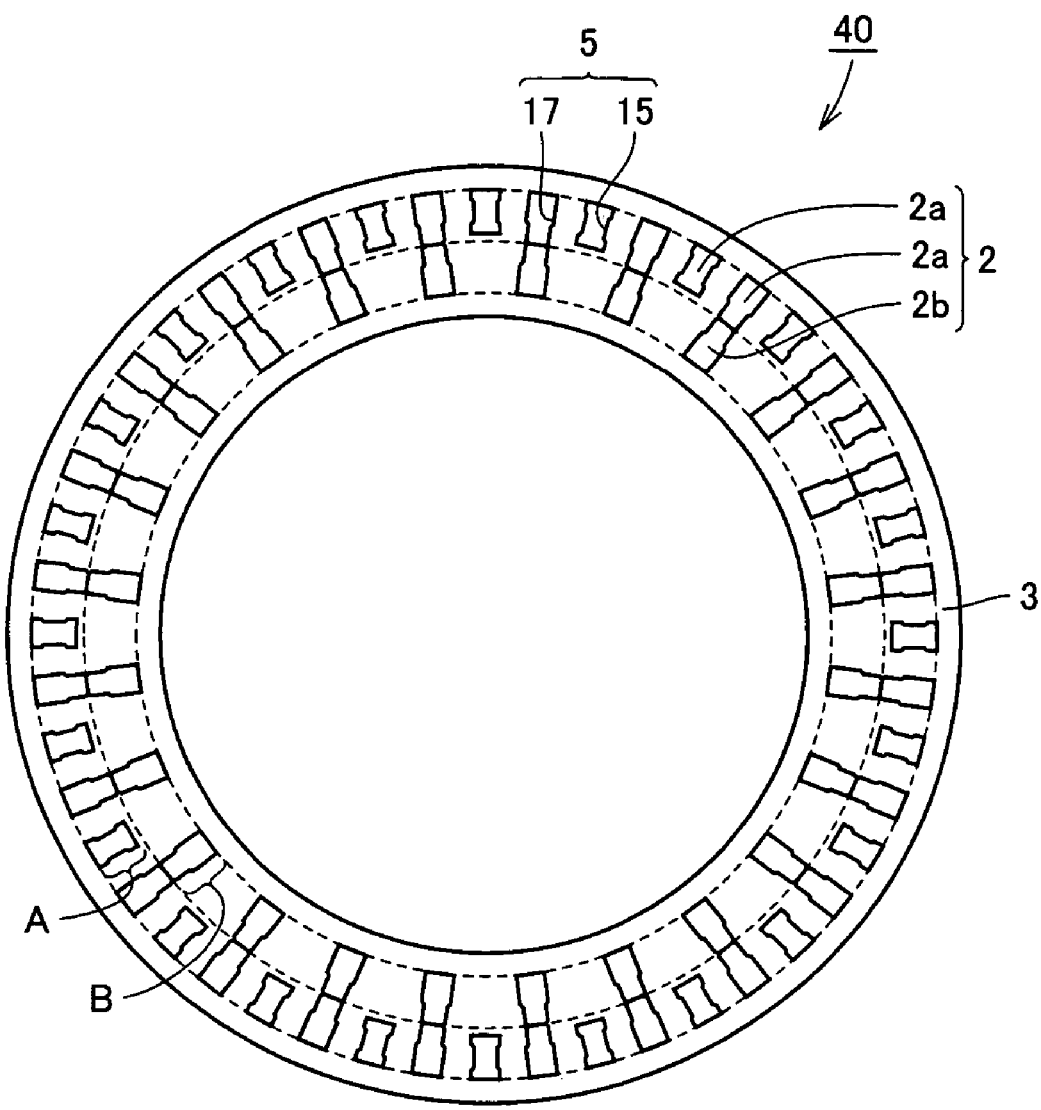
FIG. 17 is a plan showing a thrust needle roller bearing according to an eighth embodiment of the invention.

Referring to FIG. 17, a thrust needle roller bearing 40 of an eighth embodiment has the plurality of pockets 5, which accommodate the plurality of needle rollers 2 in multiple (two) rows. Retainer 3 has the plurality of pockets 15 and a plurality of pockets 17, which are arranged alternately to each other, and are equally spaced from each other. The plurality of pockets 15 are arranged on the radially outer side. Each pocket 15 accommodates only one of needle rollers 2, and each pocket 17 accommodates two needle rollers 2 aligned in the radial direction. Among the plurality of needle rollers 2 arranged in two rows, needle rollers 2*a* are arranged on the radially outer side of retainer 3 (i.e., in the row within region A defined by dotted line in FIG. 17). Among the plurality of needle rollers 2 arranged in two rows, needle rollers 2*b* are arranged on the radially inner side of retainer 3 (i.e., in the row within region B defined by dotted line in FIG. 17). Needle rollers 2*a* are larger in number than needle rollers 2*b*. Half the needle rollers 2*a* are arranged in pockets 15, respectively, and the other half of needle rollers 2*a* are arranged in pockets 17, respectively. Each pocket 17 also accommodates needle roller 2*b*. Thus, the plurality of needle rollers 2 are formed of a first group, in which each needle roller 2 is arranged alone in each pocket 15, and a second group, in which two needle rollers 2 are arranged in each pocket 17.

Structures of thrust needle roller bearing 40 other than the above are substantially the same as those of thrust needle roller bearing 1 of the first embodiment shown in FIGS. 1 to 5. Therefore, the same members bear the same reference numbers, and description thereof is not repeated.

Figure 18:
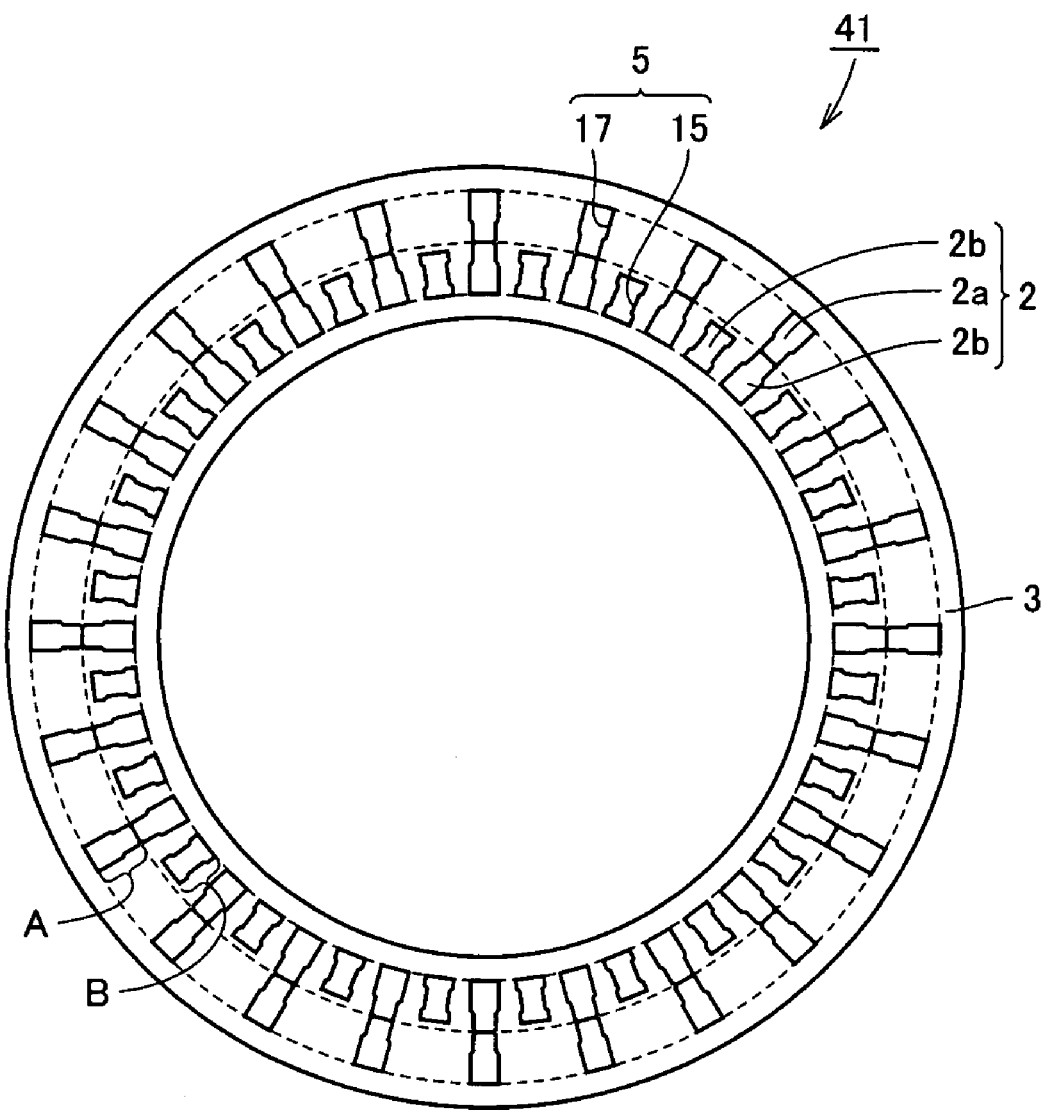
FIG. 18 is a plan showing another thrust needle roller bearing according to an eighth embodiment of the invention.

The thrust needle roller bearing according to the invention may have a structure shown in FIG. 18.

Referring to FIG. 18, a thrust needle roller bearing 41 has the plurality of pockets 15, which are arranged on the radially inner side of retainer 3, and needle rollers 2*a* are smaller in number than needle rollers 2*b*. In this structure, thrust needle roller bearing 41 differs from thrust needle roller bearing 40.

As described above, thrust needle roller bearings 40 and 41 of this embodiment differ from thrust needle roller bearing 1 of the first embodiment in position of needle rollers 2 and position of pockets 5. The structures of this embodiment can achieve the effect similar to that of the first embodiment.

(Ninth Embodiment)

Figure 19:
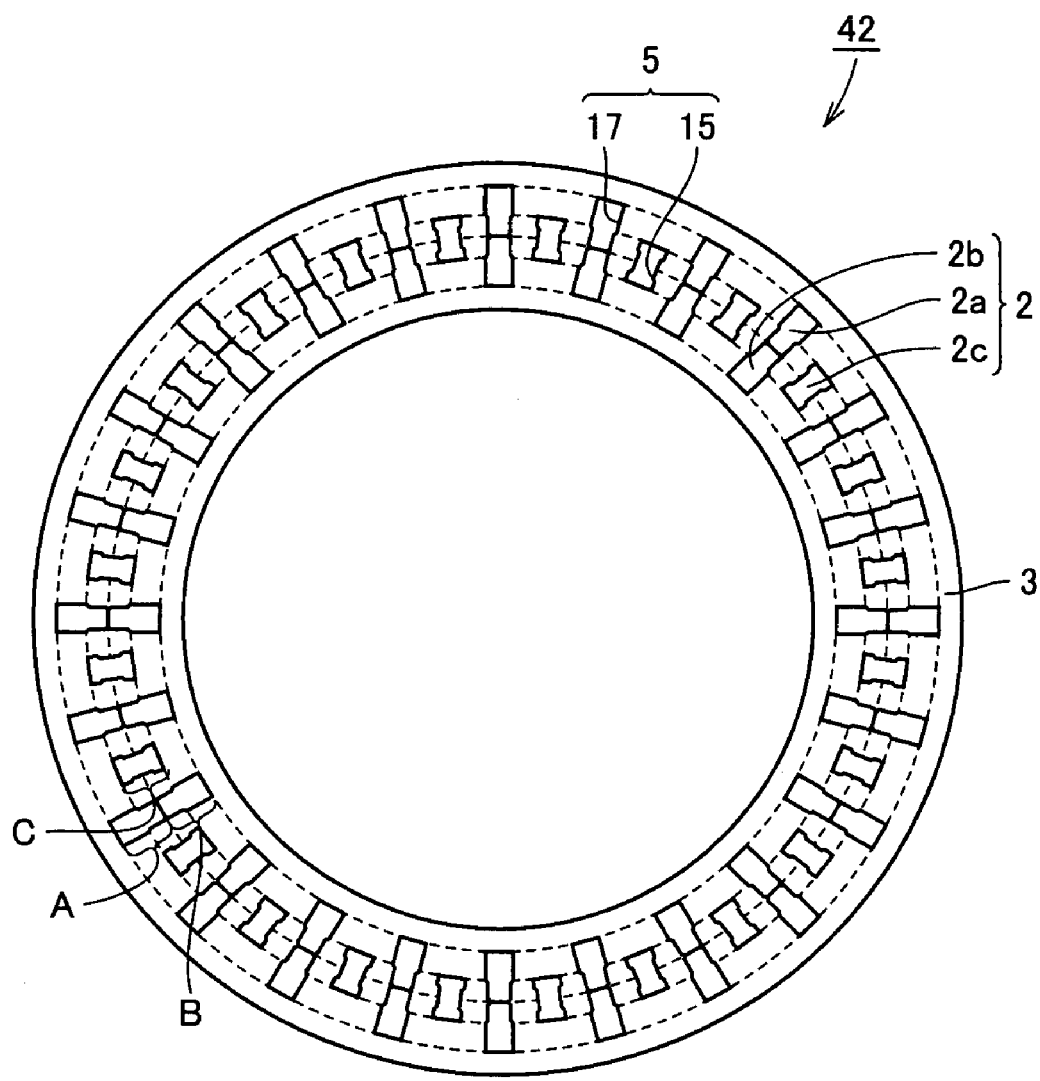
FIG. 19 is a plan showing a thrust needle roller bearing according to a ninth embodiment of the invention.

Referring to FIG. 19, a thrust needle roller bearing 42 of a ninth embodiment includes the plurality of pockets 5, which accommodate the plurality of needle rollers 2 arranged in multiple (three) rows. Retainer 3 has the plurality of pockets 15 and the plurality of pockets 17, which are arranged alternately to each other, and are equally spaced from each other. Each pocket 15 is aligned in a circumferential direction of retainer 3 to a radially middle portion of pocket 17. Each pocket 15 accommodates only one of needle rollers 2, and each pocket 17 accommodates two needle rollers 2, which are aligned in the radial direction. Among the plurality of needle rollers 2 arranged in three rows, needle rollers 2*a* are arranged in pockets 17, respectively, and are located on a radially outer side of retainer 3 (i.e., in the row within region A defined by dotted line in FIG. 19). Among the plurality of needle rollers 2 arranged in three rows, needle rollers 2*b* are arranged in pockets 17, respectively, and are located on a radially inner side of retainer 3 (i.e., in the row within region B defined by dotted line in FIG. 19). Needle rollers 2*a* are equal in number to needle rollers 2*b*. Needle rollers 2*c* are arranged in respective pockets 15, which are located in a region C defined by dotted line in FIG. 19. Thus, the plurality of needle rollers 2 are formed of a first group of needle rollers 2, which are arranged in respective pockets 15 in a one-to-one relationship, and a second group of needle rollers 2 arranged such that each pocket 17 accommodates two needle rollers 2.

Structures of thrust needle roller bearing 42 other than the above are substantially the same as those of thrust needle roller bearing 40 of the eighth embodiment shown in FIG. 17. Therefore, the same members bear the same reference numbers, and description thereof is not repeated.

As described above, thrust needle roller bearing 42 of this embodiment differs from thrust needle roller bearing 40 of the eighth embodiment in position of needle rollers 2 and position of pockets 5. The structure of this embodiment can achieve the effect similar to that of the eighth embodiment.

(Tenth Embodiment)

Figure 20B:
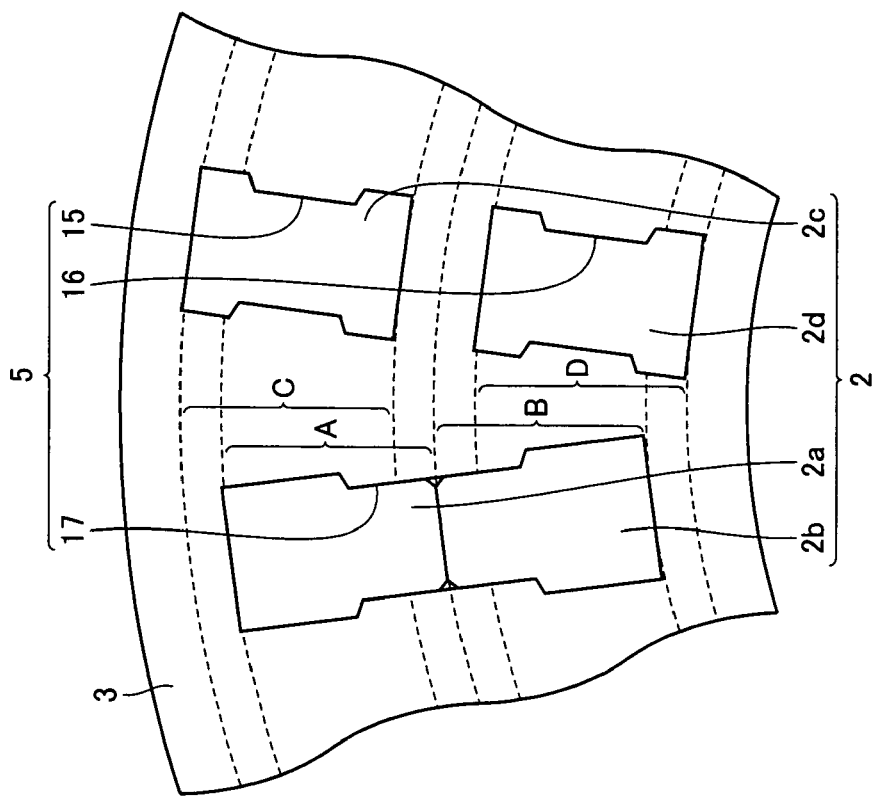
FIG. 20B is a view showing, on an enlarged scale, a portion in FIG. 20B.
Figure 20A:
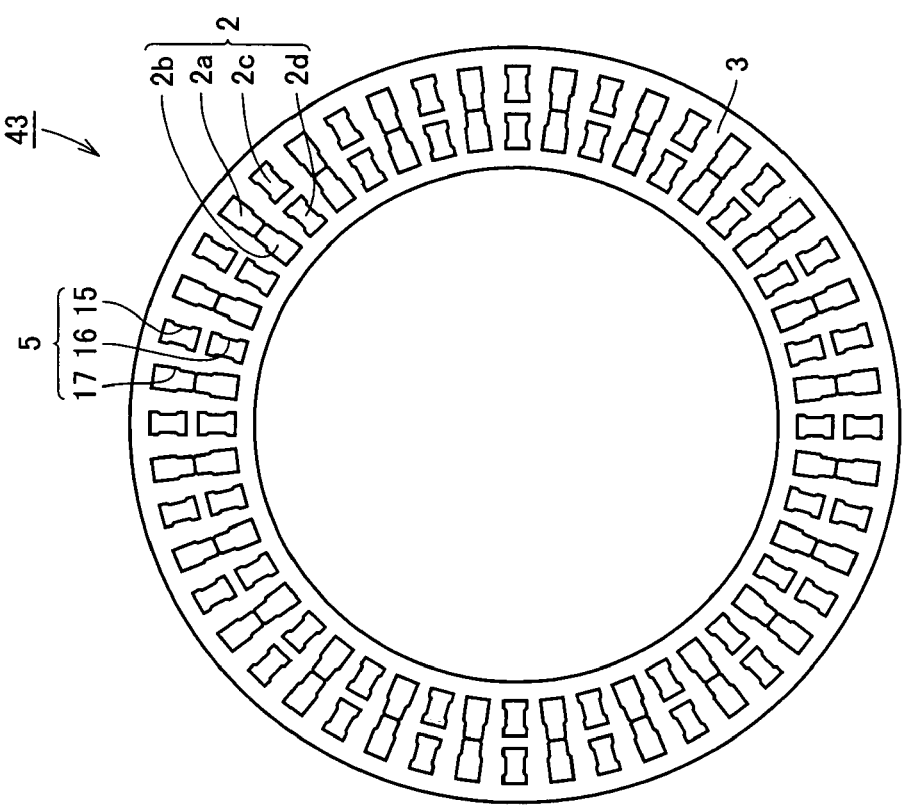
FIG. 20A is a plan showing a thrust needle roller bearing according to a tenth embodiment of the invention.
Figure 21A:
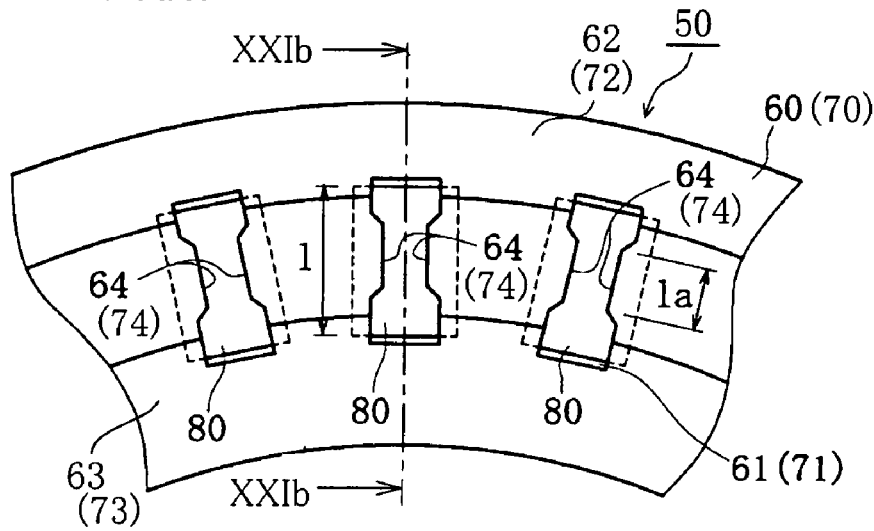
FIG. 21A is a plan fragmentarily showing a conventional thrust needle roller bearing.
Figure 21B:
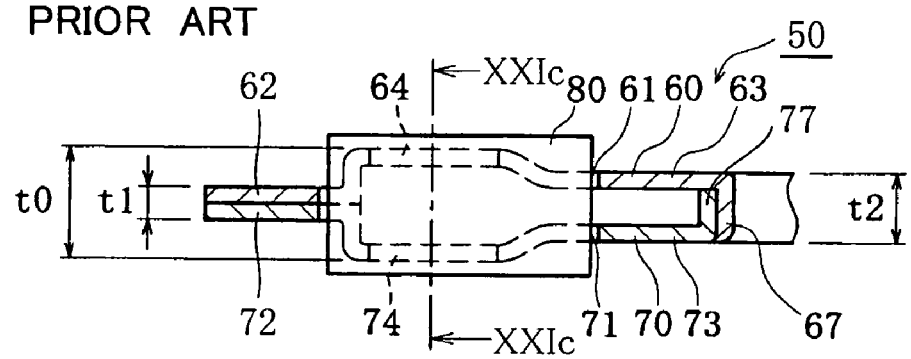
FIG. 21B is a cross section taken along line XXIb—XXIb in FIG. 21A.
Figure 21C:
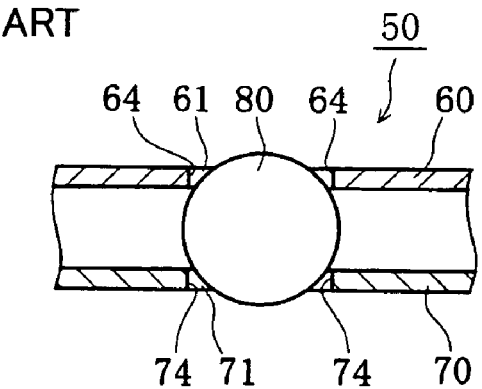
FIG. 21C is a cross section taken along line XXIc—XXIc in FIG. 21B.

Referring to FIGS. 20A and 20B, a thrust needle roller bearing 43 of a tenth embodiment includes the plurality of pockets 5, which accommodate the plurality of needle rollers 2 in multiple (four) rows. Retainer 3 has the plurality of pockets 15 and 16 as well as the plurality of pockets 17. The plurality of pocket pairs 15 and 16 are arranged alternately to the plurality of pockets 17, and are equally spaced from pockets 17. Each pocket 15 is arranged on the radially outer side, and each pocket 16 is arranged on the radially inner side. Each of pockets 15 and 16 accommodates only one needle roller 2, and each pocket 17 accommodates two needle rollers 2 aligned in the radial direction. Among the plurality of needle rollers 2 arranged in the four rows, needle rollers 2*a* are arranged in pockets 17, respectively, and are located on the radially outer side of retainer 3 (i.e., in the row within region A defined by dotted line in FIG. 20B). Among the plurality of needle rollers 2 arranged in the four rows, needle rollers 2*b* are arranged in pockets 17, respectively, and are located on the radially inner side of retainer 3 (i.e., in the row within region B defined by dotted line in FIG. 20B). Among the plurality of needle rollers 2 arranged in the four rows, needle rollers 2*c* are arranged in pockets 15 located on the radially outer side of retainer 3 (i.e., in the row within region C defined by dotted line in FIG. 20B). Among the plurality of needle rollers 2 arranged in the four rows, needle rollers 2*d* are arranged in pockets 16 located on the radially inner side of retainer 3 (i.e., in the row within region D defined by dotted line in FIG. 20B). Thus, the plurality of needle rollers 2 are formed of a first group of needle rollers 2, which are arranged in respective pockets 15 and 16 in one-to-one relationship, and a second group of needle rollers 2 arranged such that each pocket 17 accommodates two needle rollers 2.

Structures of thrust needle roller bearing 43 other than the above are substantially the same as those of thrust needle roller bearing 1 of the first embodiment shown in FIGS. 1 to 5. Therefore, the same members bear the same reference numbers, and description thereof is not repeated.

As described above, thrust needle roller bearing 43 of this embodiment differs from thrust needle roller bearing 1 of the first embodiment in position of needle rollers 2 and position of pockets 5. The structure of this embodiment can achieve the effect similar to that of the eighth embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A thrust needle roller bearing comprising:
   a plurality of needle rollers, and
   an annular retainer having a plurality of pockets for retaining said needle rollers,
   wherein said plurality of pockets accommodate said plurality of needle rollers arranged in multiple rows, and said retainer is made of synthetic resin containing glass fibers in polyphenylene sulfide; and
   wherein each of end surfaces of said plurality needle rollers is a planar end surface having a surface precision of 30 µm or less.

2. The thrust needle roller bearing according to claim 1, wherein
   each of said plurality of pockets accommodates one of said plurality of needle rollers.

3. The thrust needle roller bearing according to claim 1, wherein
   each of said plurality of pockets accommodates two of said plurality of needle rollers.

4. The thrust needle roller bearing according to claim 1, wherein
   said plurality of needle rollers are formed of a first group including the needle rollers each accommodated alone in one of said plurality of pockets, and a second group including the needle rollers arranged in said pockets each accommodating two of said needle rollers.

5. The thrust needle roller bearing according to claim 1, wherein
   said plurality of pockets accommodate said plurality of needle rollers arranged in two rows, and the needle rollers arranged in the row located on the radially inner side of said retainer are equal in number to the needle rollers arranged in the row located on the radially outer side of said retainer.

6. The thrust needle roller bearing according to claim 1, wherein
   said plurality of pockets accommodate said plurality of needle rollers arranged in two rows, and the needle rollers arranged in the row located on the radially inner side of said retainer are smaller in number than the needle rollers arranged in the row located on the radially outer side of said retainer.

7. The thrust needle roller bearing according to claim 1, wherein
   said thrust needle roller bearing is used as a bearing structure bearing a thrust load of a compressor for an air conditioner of an automobile.

8. A thrust needle roller bearing comprising:
   a plurality of needle rollers, and
   an annular retainer having a plurality of pockets for retaining said needle rollers,
   wherein said plurality of pockets accommodate said plurality of needle rollers arranged in multiple rows,
   wherein said retainer is made of synthetic resin, and
   wherein said plurality of pockets accommodate said plurality of needle rollers arranged in two rows, and the needle rollers arranged in the row located on the radially inner side of said retainer are larger in number than the needle rollers arranged in the row located on the radially outer side of said retainer.

* * * * *